Patented Aug. 17, 1954

2,686,738

UNITED STATES PATENT OFFICE 2,686,738

DISPERSION OF POLYMERIC TRIFLUORO-CHLOROETHYLENE, METHOD OF PREPARING SAID DISPERSION, AND METHOD OF COATING A BASE THEREWITH

Wilber O. Teeters, River Edge, N. J., assignor to The M. W. Kellogg Company, Jersey City, N. J., a corporation of Delaware No Drawing. Application December 29, 1949, Serial No. 135,847

23 Claims. (Cl. 117—65)

This invention relates to dispersions of high molecular weight polymers of perfluorochlorocarbons as the monomers. In one aspect this invention relates to dispersions or suspensions of the normally waxy and solid polymers of the single monomer trifluorochloroethylene. In another aspect the invention relates to a method for applying normally solid polymers of trifluorochloroethylene to surfaces.

Polymers of trifluorochloroethylene possess certain physical and chemical characteristics which make the polymers particularly desirable as surface coatings and impregnants. The normally solid polymer produced from the single monomer trifluorochloroethylene is hard but not brittle and is flowable under pressure at temperatures above 225° C. The polymers of trifluorochloroethylene in general possess excellent mechanical properties, resistance to chemicals and oxidation, flame resistance, superior electrical properties and high working temperatures. Four-fifths of the weight of the polymer of the single monomer is made of the two halogens, fluorine and chlorine. The quick quenched normally solid polymer is colorless and transparent. The polymer has a high chemical stability, no effect being observed on the polymer after prolonged exposure to concentrated sulfuric acid, hydrofluoric acid, hydrochloric acid, strong caustic, fuming nitric acid, aqua regia, and other vigorous oxidizing materials. The normally solid polymer is flexible and resilient, has a high impact strength at low temperatures and is resistant to thermal shock. The polymer is not wetted by water and is unaffected by high humidity. Table I below shows some of the electrical characteristics of the normally solid polymer under high frequency:

TABLE I

*Solid polymer of trifluorochloroethylene*

| Electrical Frequency cycles/sec. | Dielectric Constant E | Dielectric Power Loss Tan | |
|---|---|---|---|
| $1 \times 10^2$ | 2.72 | 0.022 | 0.0011 |
| $1 \times 10^3$ | 2.63 | 0.27 | 0.0014 |
| $1 \times 10^4$ | 2.53 | 0.023 | 0.0012 |
| $1 \times 10^5$ | 2.46 | 0.0135 | 0.0008 |
| $1 \times 10^6$ | 2.43 | 0.0082 | 0.0004 |
| $1 \times 10^7$ | 2.35 | 0.0060 | 0.0003 |
| $1 \times 10^8$ | 2.30 | 0.0028 | 0.0002 |
| $3 \times 10^8$ | 2.30 | 0.0030 | |
| $3 \times 10^9$ | 2.30 | 0.0028 | 0.0002 |
| $1 \times 10^{10}$ | 2.29 | 0.0039 | 0.0002 |
| $2.5 \times 10^{10}$ | 2.29 | 0.0055 | |

Other physical properties of the normally solid polymer are shown below in Table II:

TABLE II

| Property | Test Result |
|---|---|
| Specific gravity | 2.1. |
| Tensile strength at 86° F., p. s. i. | 9,400. |
| Elongation at break 86° F., percent | 127. |
| Coefficient of linear expansion (−320° F. to 167° F.) | $3.5 \times 10^{-5}$. |
| Specific resistance, ohms | $5 \times 10^{17}$. |
| Water absorption, percent | 0.00. |
| Outdoor weathering | no detectable change. |

Normally solid polymers produced from the single monomer trifluorochloroethylene may be prepared by polymerizing the monomer in the presence of a suitable organic peroxide such as bis-trichloroacetyl peroxide, as the polymerizing agent, at a temperature between about −20 and about 25° C., preferably at a temperature of about −16° C. At a temperature of −16° C. the polymerization of trifluorochloroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary.

To distinguish the normally solid polymer over the oils and waxes produced with the same monomer, the polymer is described by reference to its no strength temperature. A no strength temperature (N. S. T.) of between about 200 and about 350° C. is characteristic of a normally solid polymer of the above preparation having plastic characteristics. Best plastic characteristics of the normally solid polymer are observed at N. S. T. values between about 240 and about 340. The N. S. T. values of the polymer depend upon such factors as temperature, residence time, concentration of promoter, pressure, etc. Since this invention does not relate to the method of producing the polymer of particular characteristics, further discussion thereof will not be undertaken. Other applications have been filed relating to the preparation of the polymer per se.

The no strength temperature (N. S. T.) is determined in the following manner: A sample of polytrifluorochloroethylene is hot pressed into a $\frac{1}{16}''$ thick sheet and cut into a strip of $\frac{1}{8}''$ x $\frac{1}{16}''$ x $1\frac{5}{8}''$. The strip is notched $\frac{5}{8}''$ from the top so that the dimension at the notch shall be $\frac{1}{16}''$ x $\frac{1}{16}''$. A fine wire and a standard weight is attached to one end of the strip. The weight of the polymer plus the wire and standard weight shall equal ½ gram. The strip is then attached in a furnace and fixed vertically therein. The temperature of the sample is increased at a rate of about 1½° C. per minute in the furnace as the breaking temperature is approached. The no strength temperature is the breaking temperature of the sample. Differences of about 5° C. are considered significant.

As a result of the excellent chemical and physical properties of the polymers of trifluorochloroethylene, the polymers have use as coatings on various surfaces in order to make such surfaces corrosion resistant to chemicals. The good electrical, non-wetting and flame resistant properties of the polymer also makes its use feasible as insulating coatings on electrical conductors, condensers and various parts used in electrical apparatus and circuits. The polymer may be applied to various surfaces, including flat and curved surfaces, wires, fabrics, yarn, paper, leather, cables, cans, glass, wood, etc. The polymer may be applied to metal wires, particularly aluminum, iron and copper, to act as an insulator on the surface of the wires. The coating of fabrics with polytrifluorochloroethylene renders the fabrics fireproof and shrink resistant and increases the strength of the fabrics. Heretofore, the normally solid polymer has been applied to the surface by melting the polymer and applying it to the surface, such as by extrusion, or by dissolving the solid polymer in a suitable solvent, coating the surface with the solvent and subsequently evaporating the solvent. Applying the solid polymer by extrusion to the surfaces has certain obvious disadvantages. One of these disadvantages is the fact that relatively high temperatures must be employed and at such high temperatures there is a tendency for the polymer to decompose. The decomposition of the polymer not only affects its chemical and physical characteristics, but also the products of decomposition may attack the surface which is being coated. It is also difficult to obtain thin films upon the surface when applying the polymer by extrusion, the use of thin films being highly desirable in coating wires used, for example, as armatures of motors. The solution method of application also has certain disadvantages. The substantial insolubility of the polymer in most solvents and its high viscosity with low solids content in other solvents makes this method somewhat impractical. Those solvents which have been found useful for dissolving plastic polytrifluorochloroethylene are relatively expensive which necessitates their recovery after evaporation. The solvents may also be corrosive to the surface being coated at the condition of application. The relatively high viscosity of solutions of plastic polytrifluorochloroethylene also makes their application difficult and the solutions must usually be applied at substantially elevated temperatures.

It is the object of this invention to form stable dispersions or suspensions of normally solid polymers of trifluorochloroethylene.

Another object of this invention is to provide a method for applying plastic polymers of trifluorochloroethylene to surfaces.

Still another object of this invention is to provide a method and material for dispersing the plastic polymer of trifluorochloroethylene in such a form that the dispersion may be applied to surfaces with a minimum of application difficulties.

Another object of this invention is to provide a dispersion of plastic polymer of trifluorochloroethylene in high concentrations and low viscosities in a liquid medium.

Various other objects and advantages of the present invention will become apparent to those skilled in the art.

According to this invention, finely-divided plastic polymer of trifluorochloroethylene is directly dispersed or suspended in a liquid medium comprising as a dispersant at least one compound selected from the group consisting of the aliphatic and aromatic esters and the ketones, having at least 3 carbon atoms per molecule and having a surface tension of at least about 23 dynes/cm.$^2$ at 20° C. Suitable ketones, useful as dispersants, comprise methyl isobutyl ketone, methyl ethyl ketone, di-isobutyl ketone, isophorone and cyclohexanone. Suitable esters, useful as dispersants, comprise methyl acetate, ethyl acetate, butyl acetate, ethyl propionate, amyl acetate and ethyl benzoate. The concentration of plastic polymer in the liquid medium ranges between about 10 and about 30 per cent by weight usually in a particle size of about 0.1 to about 10 microns. In addition to the dispersant, the liquid medium preferably includes a diluent. The preferred diluent is an aromatic hydrocarbon, such as xylene, toluene, or benzene. Hydrocarbon fractions containing a relatively large amount of aromatic hydrocarbons are also suitable as the preferred diluent, such fractions being naphthas and petroleum distillates. Although the aromatic compounds are much preferred as diluents to be employed together with the dispersant as the liquid suspending medium, certain other compounds may be employed as diluents. These other compounds include the aliphatic alcohols having two or more carbon atoms per molecule, unsubstituted ethers such as dibutyl ether, and relatively high boiling hydrocarbon fractions such as those boiling above about 150° C. Mixtures of alcohol and water in a volume ratio of about 1:1 to about 1:5 have been found suitable as diluents for the dispersant. The weight ratio of dispersant to diluent is in the range of about 1:2 to about 1:25, preferably in the range of about 1:2 to 1:10. The preferred dispersing medium consists essentially of di-isobutyl ketone and xylene in a weight ratio of about 1:4.

A dispersion of the plastic in an aromatic hydrocarbon, such as xylene, may be made without the use of a dispersant. The aromatic hydrocarbon has a tendency to swell the plastic much like the dispersants. That amount of the aromatic hydrocarbon which swells the plastic may be regarded as the dispersant and the excess as the diluent. Dispersions made with an aromatic hydrocarbon alone, however, are generally not as good as those made with the above dispersants.

It has been found desirable in making up the dispersion or suspension of the plastic to include in some instances a suitable plasticizer for the trifluorochloroethylene polymer. In this manner the ultimate film obtained is more resilient and pliant, with less tendency for the film to tear or scratch. Such plasticizers comprise normally liquid and waxy polymers of trifluorochloroethylene polymer. The liquid and wax polymers of trifluorochloroethylene are produced in a similar manner as described with regard to the production of normally solid polymers of trifluorochloroethylene. In general, the waxes and liquid polymers are obtained at higher temperatures and with greater concentrations of promoter, usually with a chain transfer solvent, than employed in the manufacture of normally solid polymers. Other plasticizers which may be incorporated with the dispersing medium comprise dioctyl phthalate and tricresyl phosphate. The plasticizers are incorporated in the dispersing medium in substantially the same amount as the polymer, usually in the range of about 10 to 25 weight per cent of the dispersing medium.

Applications for the polytrifluorochloroethylene dispersions in any given field will dictate the type of dispersion selected. When high temperature resistance and chemical inertness are desired, the dispersion containing only polytrifluorochloroethylene plastic will be used. On the other hand, when coating or impregnating heat destructable material, a dispersion having considerable polytrifluorochloroethylene wax or liquid along with the plastic will be necessary in order to reach the required lower fusion temperatures.

According to this invention, films of 0.1 to 5 mils in thickness of normally solid polymer of trifluorochloroethylene may be applied to metal surfaces or the like. The normally solid polymer of trifluorochloroethylene is ground in a mill to a sufficient extent that the powdered polymer passes an 80 mesh screen. Thereafter, the powdered polymer is mixed with the dispersing medium of the composition as previously described. Generally, the solid polymer is incorporated in the dispersing medium initially in an amount not over 17 weight per cent. The mixture of solid polymer and liquid dispersing medium is then introduced into a ball mill or pebble mill for further grinding. The grinding is continued for a period of at least twenty-four hours and thereafter an increased amount of solid polymer is introduced into the mixture during ball milling to bring the concentration of solid polymer to about 20 to 30 weight per cent. The ball milling is continued for another period of at least twenty-four hours. Generally, the ball milling operation is effected over a period of about four to about eight days. Any method of grinding and pulverizing the powdered polymer may be employed without departing from the scope of this invention. Roller mills, colloid mills, gear pumps, and other conventional devices may be employed. After a sufficient length of ball milling, the mixture contains finely dispersed solid polymer of about 1 micron in diameter which does not settle upon prolonged standing and has a viscosity of about 90 to 130 centipoises at room temperature.

Articles may be coated by dipping the liquid into the above mixture and air drying. A coating of not more than about one mil in thickness can be obtained by a single dip. Usually, two, three or more dips, with air drying between dips, are required to obtain the desired film thickness upon the surface of the article. After the last dip the surface containing the deposited solid polymer thereon is heated to a temperature of at least 240° C., preferably between about 380 and about 415° C., for from 30 seconds to 25 minutes to cause fusion and sintering of the solid powdered particles of polymer. Shorter periods of time within the above range are permissible with higher temperatures of fusion. When plasticizers are employed the temperature of fusion may be as low as 200° C. The lower temperatures of fusion are preferred since the tendency of the polymer to decompose and attack metal surfaces is minimized. If insufficient film thickness is obtained after about four applications followed by fusion, the entire procedure may be repeated until the desired film thickness is obtained. Other methods of application include spraying and painting. On rigid metal surfaces, it may be desirable to lower the temperature following fusion at a slow rate, giving better adhesion. On the other hand, when flexibility and toughness are required, a quick quench of the fused film will be necessary to obtain an essentially amorphous polymer.

Fillers may be added to the completed dispersion with gentle stirring or by addition prior to the grinding operation in the pebble mill. Examples of stable fillers are calcium silicate, calcium carbonate, carbon black, titanium dioxide, etc., with particle dimensions of approximately 0.5 micron in diameter. Pigments such as the phthalocyanines and chrome green can also be incorporated in the polytrifluorochloroethylene dispersions.

The following examples are offered as a better understanding of the invention and should not be construed as unnecessarily limiting thereto.

EXAMPLE I

About 45 grams of 314 N. S. T. polytrifluorochloroethylene plastic (through 80 mesh screen) was added with stirring to a liquid dispersing medium containing 71 grams of di-isobutyl ketone and 156 grams of xylene. The suspension was poured into a one quart pebble mill containing 450 cc. of flint pebbles and rotated at approximately 75 R. P. M. for 85 hours. This dispersion, containing 16.5 per cent Kel-F, flowed readily and gave complete visual coverage of a metal or glass surface whether applied by spraying, dipping, or drawing on the object coated. The dispersion dries to a white powdery material which forms a continuous film when heated to 390° C. to 415° C. for fifteen seconds. After two or three applications, a continuous coating providing excellent chemical resistance to glass and good electrical insulation to metal is obtained.

EXAMPLE II

About 42 grams of 314 N. S. T. polytrifluorochloroethylene plastic (through 80 mesh screen) was added to a liquid dispersing medium containing 30 grams of liquid chlorotrifluoroethylene polymer, 41 grams of di-isobutyl ketone and 156 grams of xylene. This suspension was added to a quart size pebble mill containing 450 cc. of flint pebbles and rotated at approximately 110 R. P. M. for about sixty-nine hours. The dispersion exhibited the properties as described in Example I with the exception that a fusion temperature of 380° C. to 400° C. is used to produce a continuous film.

EXAMPLE III

About 42 grams of 314 N. S. T. polytrifluorochloroethylene plastic (through 80 mesh screen) was added with stirring to a liquid dispersion medium consisting of 30 grams of liquid chlorotrifluoroethylene polymer, 41 grams of di-isobutyl ketone, and 156 grams of xylene. This suspension was added to a quart size ball-mill containing 500 cc. of stainless steel balls and rotated at approximately 60 R. P. M. for 135.5 hours. To this excellent dispersion was added 6 grams of 314 N. S. T. polytrifluorochloroethylene plastic and the material milled at the same rate for an additional 63.5 hours. The dispersion dries to a white powdery material which forms a continuous film when heated to 380° C. to 400° C. for fifteen seconds. After two or three applications, a continuous coating providing excellent chemical resistance to glass and good electrical insulation to metal is obtained.

EXAMPLE IV 45 grams of 314 N. S. T. polytrifluorochloroethylene plastic (through 80 mesh screen) was covered with 100 grams of di-isobutyl ketone and allowed to stand for one week. The ketone was filtered from the plastic, which contained approximately 2.5 per cent of dissolved ketone. The 47.5 grams of ketone-containing plastic was added to a liquid dispersing medium containing 68.5 grams of di-isobutyl ketone, and 156 grams of xylene. The suspension was placed in a quart pebble mill containing 450 cc. of flint pebbles and rotated for 48 hours. The dispersion dries to a white powdery material which forms a continuous film when heated to 380° C. to 400° C. for fifteen seconds. After two or three applications, a continuous coating providing excellent chemical resistance to glass and good electrical insulation to metal is obtained.

EXAMPLE V

A dispersion similar to that of Example I was employed in this example to coat copper wire. In order to obtain complete coverage on the copper wire, it was necessary to dip the wire three times, allowing the particle film to be heated to 150° C. for fifteen seconds between successive dips. After the third dip, the wire was inserted into a furnace at 390° C. for short periods of 20–30 seconds until the particles appeared to be fused without evidence of decomposition. This cycle of multiple dipping and heating followed by fusion after every third dip was repeated three times and the wire was electrically insulated. At this stage, a diameter increase of 2.6 mils was measured which represents a film thickness of 1.3 mils assuming the wire was coated uniformly. The film showed no evidence of cracking after bending the wire sharply several times. It seems likely that better coverage of the copper wire with the resulting decrease in the number of dipping operations required to obtain a film thickness of 1–2 mils can be accomplished by increasing the viscosity of the dispersion.

EXAMPLE VI

About 45 grams of 240 N. S. T. polytrifluorochloroethylene plastic (through 80 mesh screen) was added with stirring to a liquid dispersing medium containing 71 grams of di-isobutyl ketone and 156 grams of xylene. The suspension was poured into a one quart pebble mill containing 450 cc. of flint pebbles and rotated at approximately 75 R. P. M. for 85 hours. This dispersion, containing 16.5 per cent plastic, flowed readily and gave complete visual coverage of a metal or glass surface whether applied by spraying, dipping or drawing on the object coated. The dispersion dries to a white powdery material which forms a continuous film when heated to 375° C. to 390° C. for fifteen seconds. The above procedure gave a continuous film from 0.1 mil to about 0.3 mil in thickness.

EXAMPLE VII

About 199 grams of 314 N. S. T. polytrifluorochloroethylene plastic (through 80 mesh screen) was added with stirring to a thinner comprised of 176.3 grams of di-isobutyl ketone (dispersant) and 800 grams of xylene (diluent). The suspension, containing 16.8 per cent Kel-F, was poured into a one gallon pebble mill containing flint pebbles just half filling the mill. The liquid just covered the pebbles. The mill was rotated at approximately 75 R. P. M. for 96 hours, at the end of which time the plastic was colloidally dispersed in the suspension medium. An additional 45.3 grams of plastic was added to the mill (total of 20 per cent plastic) and the mill operated for 48 hours. The free-flowing colloidally dispersed plastic gave good coverage to metal and glass surfaces when the latter were dipped into the dispersion. After air-drying, the plastic particles were fused to a continuous film by heating to 390–415° C. for from fifteen seconds to one minute.

Addition of sufficient plastic in the above example to make the total concentration 23 per cent and 48 hours of pebble milling produced a dispersion which exhibited thixotropic properties. Due to the buttery gel-like nature of the product, it is difficult to apply to metal and glass surfaces.

EXAMPLE VIII

About 260 grams of polytrifluorochloroethylene wax (M. P. 98° C.), 36 grams of 240 N. S. T. polytrifluorochloroethylene plastic, and 140 grams of xylene were placed in a quart size pebble mill and milled for 96 hours. The dispersion contained 67.9 per cent total solids, and the ratio of plastic to wax was 12:88. Paper suitable for bottle cap liners was dipped into the dispersion, air-dried, and heated to 200° C. for a short time. A continuous coating of wax plastic approximately 1 mil thick was formed on the surface of the paper and imparted water-vapor impermeability, gas impermeability, flame resistance, resistance to chemicals, etc., to the paper.

EXAMPLE IX

About 150 grams of polytrifluorochloroethylene wax (M. P. 98° C.), 50 grams of 240 N. S. T. polytrifluorochloroethylene plastic, and 238 grams of xylene were placed in a quart size pebble mill and milled for 96 hours. The resulting dispersion contained 45.6 per cent total solids and a plastic to wax ratio of 25:75. The dispersion was sprayed onto tin coated iron and fused at 200° C. for five minutes. A continuous 2 mil protective coating was formed.

EXAMPLE X

About 60 grams of polytrifluorochloroethylene wax (M. P. 70° C.), 60 grams of 300 N. S. T. polytrifluorochloroethylene plastic, and 275 grams of xylene were placed in a quart size pebble mill and milled for 96 hours. The resulting dispersion contained 30 per cent total solids and a plastic to wax ratio of 1:1. The dispersion was brushed onto aluminum surfaces, air-dried, and fused at 235° C. for five minutes. A hard well-adhering protective film was formed on the aluminum.

In the above Examples VIII, IX and X substantially all of the wax was dissolved in the xylene. The per cent solids in the dispersion, therefore, represents both undissolved plastic and dissolved wax.

EXAMPLE XI 46.2 grams of 300 N. S. T. polytrifluorochloroethylene plastic (screen analysis indicated 66 per cent through 80 mesh) was added with stirring to a thinner consisting of 41 grams of butyl acetate and 186 grams of xylene. This suspension was charged to a quart size ball-mill jar containing approximately 450 mils of flint pebbles and rotated for 139 hours. To this excellent dispersion was added 10.2 grams of 300 N. S. T. plastic and milling continued for 96 additional hours. The resultant dispersion (20 per cent plastic) was too viscous for adequate film deposition by dipping and was diluted with stirring by the addition of 12.8 grams of butyl acetate and 57.9 grams of xylene. The final dispersion (16 per cent Kel-F) deposited an even film of Kel-F particles which fused to a continuous coat at 380° C. to 400° C.

EXAMPLE XII 46.2 grams of 300 N. S. T. polytrifluorochloroethylene plastic (screen analysis indicated 66 per cent through 80 mesh) was added with stirring to a thinner consisting of 41 grams of methyl isobutylketone and 186 grams of xylene. This suspension was charged to a quart size pebble-mill jar containing approximately 450 mils of flint pebbles and rotated for 139 hours. To this dispersion was added 10.5 grams of the 300 N. S. T. plastic and milling continued for 47 hours. The resultant dispersion (20 per cent plastic) was excellent. The final dispersion deposited an even film of plastic polytrifluorochloroethylene particles which fused at 380° C. to 400° C.

Copper wire was coated with thin films of polytrifluorochloroethylene plastic by means of dispersions of suitable viscosities and a Hytron unit which is used in the wire coating field for preliminary evaluation of wire insulating materials prior to tests in commercial wire coating units. The Hytron unit consists of a baking oven, approximately 21 inches in length, which can be heated to a maximum temperature of 1000° C., of two applicators which are located within about 8 inches of either end of the oven and which can be used separately or in combination, and of conventional apparatus for regulating the speed of the wire through the oven and for guiding the wire for multiple coating. Recycling the wire back and forth through the applicators and the oven is used to build up the wall thickness.

The wire, A. W. G. No. 28, was coated at various rates from 2 ft./min. at 400° C. to 20 ft./min. at 720° C. The temperatures recorded were the air temperatures of the oven. The time in the oven varied from approximately 53 seconds at the low rate to 5 seconds at the high rate.

By multiple coating it is possible to build up coatings 5 mils (0.005 inch) or more in thickness; by increasing the viscosity of the dispersion, i. e., by increasing the plastic concentration, fewer applications are required. For example, wire was coated with a film 1 mil thick by passing the wire 8 times through a single applicator containing a 20 per cent plastic dispersion. When the concentration of the dispersion was adjusted to 30 per cent plastic, only 4 passes through a single applicator were required. Both of these coatings used a wire rate of 14 ft./min., oven temperature of 600° C., and the wire remained in the oven 7.6 seconds per pass.

The thin polytrifluorochloroethylene plastic coatings possessed good mechanical and electrical properties and good chemical resistance.

Paper, fabric, and ceramic sheets coated with trifluorochloroethylene polymers are used as jackets for the insulation of wire and cable. The fabrics or papers are applied in the form of tapes, sheets, or braids. For high temperature resistance insulators the straight polytrifluorochloroethylene plastic dispersion is used to coat the wrapping. Polytriflorochloroethylene wax dispersions may be used in applications where high temperature resistance is not needed. A final polytrifluorochloroethylene coat may be placed over the wrapped wire, if desirable.

The dispersions may be used to coat individual or multiple strands in lengths or on windings directly by dip or spray methods followed by fusion at elevated temperatures. These dispersions are of particular value because they permit a ratio of the film dielectric strength to film thickness higher than that of other insulating materials. Also of value are the excellent electrical characteristics, low moisture absorption, and good chemical resistance of the polytrifluorochloroethylene coating. A specific example is coating of copper magnet wire for motor armatures and generators.

The dispersions may be used as saturants for the treatment of asbestos braids (plus fusion treatment) employed on a number of small power cables, switchboard, and stove wires.

Dispersions of polytrifluorochloroethylenes are particularly useful in thin-walled electrical insulation, coating of electrical assemblies such as condensers, resistors, and the like, requiring low moisture absorption and high heat distortion point.

Protection of metal against the various service conditions to which it may be exposed is solved in numerous cases by coating the exposed surface with polytrifluorochloroethylene applied from dispersion. A specific example is the coating of large gate valves made of steel. The valves are to be used in a highly corrosive acid solution at 80–90° C. The surface of the metal to be coated is pretreated by solvent dip followed by mild picking in order to obtain optimum adhesion of the polytrifluorochloroethylene film. A 20 per cent plastic dispersion is passed over the surface to be coated and the coated valve drained, air-dried and fused for two minutes at 390° C. This operation is repeated in order to make certain that no exposed surfaces remain. The resulting continuous film had a thickness of 1.5 mils and successfully protected the gate valve from corrosion. Another example is the coating of the inside of an aluminum tank with polytrifluorochloroethylene wax-plastic dispersion so that it will withstand the action of white-fuming and dilute nitric acid and vapors at temperatures up to 80° C. The tank is partially filled with the polytrifluorochloroethylene wax dispersion, rotated to completely wet the internal surface, drained, dried by passing a warm inert gas into the tank, and fused at 200° C. for ten minutes. This operation is repeated two more times and a continuous nonporous film 1 mil thick built up which meets the desired specification.

The above wax-plastic dispersion is especially suited for the coating of cans. A fusion temperature of 200° C. for ten minutes is suitable in the can coating industry and this inert film formed does not impart odor, color, or taste to the can ingredients.

The dispersion is deposited on the surface of the metal to be used in making cans by means of conventional roller coating techniques.

The present invention includes within its scope polymers of trifluorochloroethylene which include a minor amount of other monomers, such as vinyl chloride, tetrafluoroethylene, perfluoropropene and acrylonitrile. The use of these other monomers is limited to less than about 15 per cent of the polymer. In some instances it is desirable to use small quantities of other monomers in combination with the principal monomer trifluorochloroethylene in order to impart modified characteristics to the resulting polymer.

I claim:

1. A composition of matter which comprises a mixture of a polymer of trifluorochloroethylene containing less than about 15 per cent of a comonomer copolymerizable with trifluorochloroethylene and a liquid medium comprising at least one compound selected from a group consisting of the normally liquid aliphatic and aromatic ketones, having a surface tension of at least about 23 dynes/cm.$^2$ at 20° C. and having at least three carbon atoms per molecule and butyl acetate.

2. A dispersion which comprises a plastic polymer of trifluorochloroethylene containing less than about 15 per cent of a comonomer copolymerizable with trifluorochloroethylene dispersed in a liquid medium comprising as a dispersant at least one compound selected from the group consisting of the normally liquid aliphatic and aromatic ketones, having a surface tension of at least about 23 dynes/cm.$^2$ at 20° C. and having at least three carbon atoms per molecule and butyl acetate; the concentration of plastic in the dispersion being between about 10 and about 30 per cent by weight.

3. A dispersion which comprises a plastic polymer of trifluorochloroethylene containing less than about 15 per cent of a comonomer copolymerizable with trifluorochloroethylene dispersed in a liquid medium comprising as a dispersant at least one compound selected from the group consisting of the normally liquid aliphatic and aromatic ketones, having a surface tension of at least about 23 dynes/cm.$^2$ at 20° C. and having at least three carbon atoms per molecule and butyl acetate as a dispersant and a diluent, the concentration of plastic in the dispersion being between about 10 and about 30 per cent by weight, the weight ratio of dispersant to diluent being between about 1:2 and about 1:25.

4. A liquid composition which comprises a liquid dispersing medium and a plastic polymer of trifluorochloroethylene containing less than about 15 per cent of a comonomer copolymerizable with trifluorochloroethylene and which can be applied to surfaces at relatively low temperatures to yield on evaporation of said liquid dispersing medium and a continuous tough film on the surface coated; said composition comprising a plastic polymer of trifluorochloroethylene suspended in a liquid medium comprising as a dispersant at least one compound selected from the group consisting of the normally liquid aliphatic and aromatic ketones, having a surface tension of at least about 23 dynes/cm.$^2$ at 20° C. and having at least three carbon atoms per molecule and butyl acetate; the concentration of plastic in the composition being between about 10 and about 30 per cent by weight, and the viscosity of the dispersion being less than about 130 centipoise.

5. A dispersion which comprises a plastic polymer of trifluorochloroethylene containing less than about 15 per cent of a comonomer copolymerizable with trifluorochloroethylene dispersed in a normally liquid ketone having a surface tension of at least about 23 dynes/cm.$^2$ at 20° C. and having at least three carbon atoms per molecule.

6. A dispersion which comprises finely-divided particles of the plastic polymer of trifluorochloroethylene containing less than about 15 per cent of a comonomer copolymerizable with trifluorochloroethylene dispersed in di-isobutyl ketone.

7. A dispersion which comprises finely-divided particles of the plastic homopolymer of trifluorochloroethylene dispersed in a liquid medium comprising di-isobutyl ketone and xylene.

8. A dispersion which comprises finely-divided particles of the plastic polymer of trifluorochloroethylene containing less than about 15 per cent of a comonomer copolymerizable with trifluorochloroethylene dispersed in methyl isobutyl ketone.

9. A dispersion which comprises a plastic polymer of trifluorochloroethylene containing less than about 15 per cent of a comonomer copolymerizable with trifluorochloroethylene dispersed in butyl acetate.

10. A dispersion which comprises finely-divided particles of the plastic of trifluorochloroethylene containing less than about 15 per cent of a comonomer copolymerizable with trifluorochloroethylene dispersed in a liquid medium comprising at least one compound selected from the group consisting of the normally liquid aliphatic and the aromatic ketones, having a surface tension of at least about 23 dynes/cm.$^2$ at 20° C. and having at least three carbon atoms per molecule and butyl acetate as a dispersant and an aromatic hydrocarbon as a diluent.

11. A dispersion which comprises finely-divided particles of the plastic polymer of trifluorochloroethylene containing less than about 15 per cent of a comonomer copolymerizable with trifluorochloroethylene dispersed in a normally liquid ketone having a surface tension of at least about 23 dynes/cm.$^2$ at 20° C. and having at least three carbon atoms per molecule as a dispersant and toluene as a diluent.

12. A dispersion which comprises finely-divided particles of the plastic polymer of trifluorochloroethylene containing less than about 15 per cent of a comonomer copolymerizable with trifluorochloroethylene dispersed in a normally liquid ketone having a surface tension of at least about 23 dynes/cm.$^2$ at 20° C. and having at least three carbon atoms per molecule as a dispersant and benzene as a diluent.

13. A dispersion which comprises finely-divided particles of the plastic polymer of trifluorochloroethylene containing less than about 15 per cent of a comonomer copolymerizable with trifluorochloroethylene dispersed in a liquid medium comprising at least one compound selected from the group consisting of the normally liquid aliphatic and aromatic ketones, having a surface tension of at least about 23 dynes/cm.$^2$ at 20° C. and having at least three carbon atoms per molecule and butyl acetate, as a dispersant and an aliphatic alcohol having at least two carbon atoms per molecule as a diluent.

14. A dispersion which comprises finely-divided particles of the plastic polymer of trifluorochloroethylene containing less than about 15 per cent of a comonomer copolymerizable with trifluorochloroethylene dispersed in a liquid medium comprising at least one compound selected from the group consisting of the normally liquid aliphatic and aromatic ketones, having a surface tension of at least about 23 dynes/cm.$^2$ at 20° C. and having at least three carbon atoms per molecule and butyl acetate, as a dispersant and a relatively high boiling hydrocarbon fraction boiling above about 150° C. as a diluent.

15. The method for applying a film of the plastic polymer of trifluorochloroethylene containing less than about 15 per cent of a comonomer copolymerizable with trifluorochloroethylene to a surface which comprises admixing plastic polymer of trifluorochloroethylene of relatively large particle size of the order of 80 mesh with a liquid dispersing medium comprising as a dispersant at least one compound selected from the group consisting of the normally liquid aliphatic and aromatic ketones, having a surface tension of at least about 23 dynes/cm.$^2$ at 20° C. and having at least three carbon atoms per molecule and butyl acetate, pulverizing the plastic polymer of trifluorochloroethylene while in admixture with the liquid dispersing medium to reduce the particle size of said polymer and to form a dispersion thereof, contacting the surface to be coated with the resulting dispersion a plurality of times, drying the surface between contacts, and after the last contact heating the surface to be coated to a temperature of at least 200° C. for a sufficient period of time to cause fusion of the polymer and to form a continuous film of the plastic upon the surface.

16. The method for coating a surface with the plastic homopolymer of trifluorochloroethylene which comprises admixing the plastic polymer of trifluorochloroethylene of relatively large particle size with a normally liquid ketone having a surface tension of at least about 23 dynes/cm.$^2$ at 20° C. and having at least three carbon atoms per molecule, milling the plastic polymer while in admixture with the ketone for at least 24 hours to reduce the particle size of said polymer and to form a dispersion, dipping the surface to be coated in the resulting dispersion a plurality of times, drying the surface to be coated after each dip, and heating the surface to be coated after the last dip to a temperature between about 380 and about 415° C. for a period of time between about 30 seconds and about 25 minutes to form a continuous film of the plastic upon the surface.

17. The method for applying a dispersion of the plastic polymer of trifluorochlorethylene containing less than about 15 per cent of a comonomer copolymerizable with trifluorochloroethylene in a normally liquid ketone having a surface tension of at least about 23 dynes/cm.$^2$ at 20° C. and having at least three carbon atoms per molecule to surfaces which comprises dipping the surface to be coated in the dispersion a plurality of times, drying the surface between dips, and heating the surface after the last dip to a temperature between about 380 and about 415° C. for a period of time between about 30 seconds and about 25 minutes to form a continuous uniform film of plastic upon the surfaces to be coated.

18. The method for preparing a dispersion of the plastic polymer of trifluorochloroethylene containing less than about 15 per cent of a comonomer copolymerizable with trifluorochloroethylene which comprises admixing the plastic polymer of trifluorochloroethylene of relatively large particle size with a liquid dispersing medium comprising as a dispersant at least one compound selected from the group consisting of the normally liquid aliphatic and aromatic ketones, having a surface tension of at least about 23 dynes/cm.$^2$ at 20° C. and having at least three carbon atoms per molecule and butyl acetate, and pulverizing the plastic polymer of trifluorochloroethylene while in admixture with the liquid dispersing medium to reduce the particle size of said polymer and to form the dispersion.

19. The method for applying a dispersion of the plastic polymer of trifluorochloroethylene containing less than about 15 per cent of a comonomer copolymerizable with trifluorochloroethylene in a dispersant comprising at least one compound selected from the group consisting of the normally liquid aliphatic and aromatic ketones having a surface tension of at least about 23 dynes/cm.$^2$ at 20° C. and having at least three carbon atoms per molecule and butyl acetate which comprises contacting the surface to be coated with the resulting dispersion a plurality of times, drying the surface between contacts and after the last contact heating the surface to be coated to a temperature of at least 200° C. and for a sufficient period of time to cause fusion of the polymer and to form a continuous film of the plastic upon the surface.

20. The method for preparing a dispersion of the plastic polymer of trifluorochloroethylene containing less than about 15 per cent of a comonomer copolymerizable with trifluorochloroethylene which comprises admixing the plastic polymer of trifluorochloroethylene of relatively large particle size with a normally liquid ketone having a surface tension of at least about 23 dynes/cm.$^2$ at 20° C. and having at least three carbon atoms per molecule, milling the plastic polymer while in admixture with the ketone for at least twenty-four hours to reduce the particle size of said polymer and to form the dispersion.

21. The method for preparing a dispersion of the plastic polymer trifluorochloroethylene containing less than about 15 per cent of a comonomer copolymerizable with trifluorochloroethylene containing more than 17 weight per cent plastic which comprises admixing an amount of plastic polymer of trifluorochloroethylene of relatively large particle size of the order of 80 mesh with a liquid dispersing medium comprising as a dispersant at least one compound selected from the group consisting of the normally liquid aliphatic and aromatic ketones, having a surface tension of at least about 23 dynes/cm.$^2$ at 20° C. and having at least three carbon atoms per molecule and butyl acetate, such that the mixture contains not more than 17 weight per cent plastic, pulverizing the plastic polymer of trifluorochloroethylene while in admixture with the liquid dispersing medium for at least twenty-four hours to reduce the particle size of said polymer and to form a dispersion thereof, thereafter admixing an additional amount of plastic polymer of trifluorochloroethylene with the resulting dispersion sufficient to bring the concentration of plastic in the ultimate dispersion above 17 weight per cent and pulverizing the added plastic polymer of trifluorochloroethylene while in admixture with the liquid dispersing medium for at least twenty-four hours to form a dispersion having a concentration of plastic therein greater than 17 weight per cent.

22. A dispersion which comprises a plastic homopolymer of trifluorochloroethylene and a liquid medium comprising at least one compound selected from the group consisting of the normally liquid aliphatic and aromatic ketones, having a surface tension of at least about 23 dynes/cm.$^2$ at 20° C. and having at least three carbon atoms per molecule and butyl acetate.

23. The method for preparing a dispersion of a plastic homopolymer of trifluorochloroethylene which comprises pulverizing said plastic homopolymer of trifluorochloroethylene of relatively large particle size to reduce the particle size to about one micron and mixing the plastic homopolymer of trifluorochloroethylene of a particle size of about one micron with a liquid medium comprising a compound selected from the group consisting of the normally liquid aliphatic and aromatic ketones having a surface tension of at least about 23 dynes/cm.$^2$ at 20° C. and having at least 3 carbon atoms per molecule and butyl acetate.

References Cited in the file of this patent

UNITED STATES PATENTS

| Number | Name | Date |
|---|---|---|
| 2,431,078 | Powell | Nov. 17, 1947 |
| 2,484,483 | Berry | Oct. 11, 1949 |
| 2,559,752 | Berry | July 10, 1951 |
| 2,581,454 | Sprung | Jan. 8, 1952 |